United States Patent [19]

Thomas et al.

[11] Patent Number: 5,378,385
[45] Date of Patent: Jan. 3, 1995

[54] PARTIALLY FLUORINATED SILICONE REFRIGERATION LUBRICANTS

[75] Inventors: Raymond H. P. Thomas, Amherst; David P. Wilson, Williamsville; Hang Pham, North Tonawanda; John W. Pelava, Buffalo, all of N.Y.

[73] Assignee: AlliedSignal Inc., Morris Township, Morris County, N.J.

[21] Appl. No.: 455,691

[22] Filed: Dec. 21, 1989

[51] Int. Cl.$^6$ .................... C09K 5/04; C10M 105/76; C10M 105/50
[52] U.S. Cl. ..................... 252/68; 252/49.6; 252/58; 252/67; 252/78.3
[58] Field of Search ............ 252/58, 68, 67, 78.3, 252/49.6

[56] References Cited

U.S. PATENT DOCUMENTS

| | | | |
|---|---|---|---|
| 4,818,423 | 4/1989 | Steinbach et al. | 252/49.6 |
| 4,851,144 | 7/1989 | McGraw | 252/52 A |
| 4,946,611 | 8/1990 | Kaneko | 252/68 |

OTHER PUBLICATIONS

A review of Synthetic Oils for Refrigeration Use, Sanvordenker et al, Ashrae Symposium, Jun. 1972.
Lubricants for Refrigeration Machines, Steinbach et al, German Unexamined Patent Application 2,750,980, May 1979.

*Primary Examiner*—Christine Skane
*Attorney, Agent, or Firm*—Melanie L. Brown; Karen A. Harding

[57] ABSTRACT

The present invention provides a composition for use in compression refrigeration and air-conditioning. The composition comprises: (a) a refrigerant selected from the group consisting of hydrofluorocarbon and hydrochlorofluorocarbon; and (b) a sufficient amount to provide lubrication of at least one fluorinated silicone. The fluorinated silicone has units therein selected from the group consisting of fluoroalkyl and alkyl. If both fluoroalkyl and alkyl units are present in the fluorinated silicone, at least 25% of the units are fluoroalkyl. The fluorinated silicone has a molecular weight between about 280 and about 6,000; a viscosity of about 10 to about 300 centistokes at 38° C. (0.1 to 3 cm$^2$/sec), and is miscible in combination with the refrigerant in the range between −40° C. and at least +20° C.

33 Claims, No Drawings

PARTIALLY FLUORINATED SILICONE REFRIGERATION LUBRICANTS

BACKGROUND OF THE INVENTION

The present invention relates to lubricants used with refrigerants. More particularly, the present invention relates to lubricants for use with tetrafluoroethane, and preferably, 1,1,1,2-tetrafluoroethane (known in the art as R134a). R134a is a refrigerant which may replace dichlorodifluoromethane (known in the art as R12) in many applications because environmental concerns over the use of R12 exist.

R134a has been mentioned as a possible replacement for R12 because concern over potential depletion of the ozone layer exists. R12 is used in closed loop refrigeration systems; many of these systems are automotive air-conditioning systems. R134a has properties similar to those of R12 so that it is possible to substitute R134a for R12 with minimal changes in equipment being required. The symmetrical isomer of R134a is 1,1,2,2-tetrafluoroethane (known in the art as R134); the isomer is similar in properties also and may also be used. Consequently, it should be understood that in the following discussion, "tetrafluoroethane" will refer to both R134 and R134a.

A unique problem arises in such a substitution. Refrigeration systems which use R-12 generally use mineral oils to lubricate the compressor; the present discussion does not apply to absorption refrigeration equipment. See for example the discussion in Chapter 32 of the 1980 ASHRAE Systems Handbook. R-12 is completely miscible with such oils throughout the entire range of refrigeration system temperatures, which may range from about −45.5° C. to 65.6° C. Consequently, oil which dissolves in the refrigerant travels around the refrigeration loop and generally returns with the refrigerant to the compressor. The oil does not separate during condensation, although it may accumulate because low temperatures exist when the refrigerant is evaporated. At the same time, the oil which lubricates the compressor contains some refrigerant which may affect its lubricating property.

It is known in the industry that chlorodifluoromethane (known in the art as R22) and a blend of monochlorodifluoromethane and monochloropentafluoroethane (known in the art as R502) are not completely miscible in common refrigeration oils. See Downing, FLUOROCARBONS REFRIGERANT HANDBOOK, 13. A solution to this problem has been the use of alkylated benzene oils. Such oils are immiscible in R134a and are not useful therewith. This problem is most severe at low temperatures when a separated oil layer would have a very high viscosity. Problems of oil returning to the compressor would be severe.

R134a is not miscible with mineral oils; consequently, different lubricants will be required for use with R134a. However, as mentioned above, no changes to equipment should be necessary when the refrigerant substitution is made. If the lubricant separates from the refrigerant, it is expected that serious operating problems could result. For example, the compressor could be inadequately lubricated if refrigerant replaces the lubricant. Significant problems in other equipment also could result if a lubricant phase separates from the refrigerant during condensation, expansion, or evaporation. These problems are expected to be most serious in automotive air-conditioning systems because the compressors are not separately lubricated and a mixture of refrigerant and lubricant circulates throughout the entire system.

These problems have been recognized generally in the refrigeration art. Two recent publications by ASHRAE suggest that separation of lubricants and refrigerants presents problems, although no mention is made of R134a. These articles are Kruse et al, "Fundamentals of Lubrication in Refrigeration Systems and Heat Pumps," *ASHRAE TRANSACTIONS* 90(2B), 763 (1984) and Spauschus, "Evaluation of Lubricants for Refrigeration and Air-Conditioning Compressors," ibid, 784.

The following discussion will be more readily understood if the mutual solubility of refrigerants and various lubricating oils is considered in general, with specific reference to R134a. Small amounts of lubricants may be soluble in R134a over a wide range of temperatures, but as the concentration of the lubricant increases, the temperature range over which complete miscibility occurs, i.e., only one liquid phase is present, narrows substantially. For any composition, two consolute temperatures, i.e., a lower and a higher temperature, may exist. That is, a relatively low temperature below which two distinct liquid phases are present and above which the two phases become miscible and a higher temperature at which the single phase disappears and two phases appear again may exist. A diagram of such a system for R502 refrigerant is shown as FIG. 2 in the Kruse et al. paper mentioned above. A range of temperatures where one phase is present exists, and while it would be desirable that a refrigeration system operate within such a range, it has been found that for typical compositions, the miscible range of lubricants with R134a is not wide enough to encompass the typical refrigeration temperatures.

Some disclosures which are concerned with the choice of lubricants when R134a is used as a refrigerant exist. Polyalkylene glycols were suggested to be used in Research Disclosure 17483, October 1978 by DuPont. Specific reference was made to such oils produced by Union Carbide Corporation under the trade names ULCON LB-165 and UCON 525 (registered trademark). It is stated that these oils are miscible in all proportions with R134a at temperatures at least as low as −50° C. It is believed that ULCON LB-165 and UCON 525 (registered trademark) are polyoxypropylene glycols which have a hydroxy group at one end of each molecule and a n-butyl group at the other end.

The use of synthetic oils for refrigeration systems including the class of fluorinated silicones is discussed by Sanvordenker et al. in a paper given at a ASHRAE Symposium, Jun. 29, 1972. The reference teaches that R12, chlorotrifluoromethane (known in the art as R13), R22, and R502 may be used with synthetic oils but does not teach R134a and states that the fluorinated silicones are expensive.

Commonly assigned U.S. Pat. No. 4,755,316 teaches a compression refrigeration composition. The refrigerant is tetrafluoroethane while the lubricant is at least one polyoxyalkylene glycol which is at least difunctional with respect to hydroxyl groups, has a molecular weight between 300 and 2,000, has a viscosity of about 25–150 centistokes (0.25–1.5 cm$^2$/sec) at 37° C., has a viscosity index of at least 20, and is miscible in combination with the tetrafluoroethane in the range between −40° and at least +20° C. The reference does not teach the present compositions of tetrafluoroethane and fluorinated silicones. Further, the Comparatives in Table C show silicone lubricants which are immiscible with R134a and thus, the reference teaches away from the use of silicone lubricants with R134a.

U.S. Pat. No. 3,642,626 teaches polysiloxanes such as of the formula:

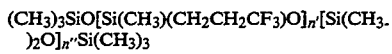

The reference teaches that n' and n" total to the value of n which is an integer of 1 to 150 and that the preferred values for n' and n" are 20 to 75. As will be discussed later, this teaching does not suggest the present compositions of refrigerants and fluorinated silicone lubricants which are miscible with the refrigerants.

German Unexamined Patent Application 2750980 dated May 17, 1979 describes lubricants for refrigeration machines and addresses the problems of suitable lubrication at low temperatures. The reference discusses known polymeric fluorosilicone lubricants which have a high degree of polymerization. The reference specifically discloses

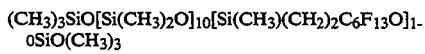

for use with chlorotrifluoromethane (known in the art as R13) and would probably be only partially miscible or even immiscible with R134a.

U.S. Pat. No. 4,818,423 teaches that certain fluorosiloxanes are useful as lubricants with R12, R13, R502, and a blend of trifluoromethane and chlorotrifluoromethane (known in the art as R503). The fluorosiloxanes have units of alkyltrisiloxy, trialkylmonosiloxy, dialkyldisiloxy, and a substituted alkyldisiloxy which is substituted by a fluorinated moiety. The dialkyldisiloxy is the major unit present. A particular fluorosiloxane lubricant has the formula:
(alkyltrisiloxy)$_3$(trialkylmonosiloxy)$_5$(substituted alkyldisiloxy)$_5$(dialkyldisiloxy)$_{50}$ As will be understood later, we believe that this fluorosiloxane lubricant would be immiscible with refrigerants such as R134a.

Japanese Patent Publication 96684 dated May 30, 1985 addresses the stability problems of refrigerants. The reference mentions twelve refrigerants including tetrafluoroethane. The reference also teaches six classes of lubricants including fluorinated silicone, perfluoro ether oligomer, fluorinated oxethane, chloro tri fluoro ethylene low polymer, fluorinated polyphenyl ether, and perfluoroamine.

Because it is expected that R134a will become widely used in the field of refrigeration and air-conditioning, lubricants useful with R134a are needed in the art. In our search for lubricants useful with R134a, we tested numerous lubricants including perfluoro ether oligomers and chlorotrifluoroethylenes as taught by the preceding Japanese reference and found that these lubricants were either immiscible or only partially miscible with R134a. We did not test a fluorinated oxethane as also disclosed by the Japanese because we were uncertain as to its composition. We also did not test fluorinated polyphenyl ethers and perfluoroamines as disclosed by the Japanese because we could not obtain commercial samples of these materials.

U.S. Pat. No. 4,755,316 teaches that silicones are immiscible with R134a at room temperature. We tested dimethyl/methyltrifluoropropyl siloxane with 20% methyltrifluoropropyl units as a fluorinated silicone and found that this fluorinated silicone was immiscible with R134a. We also tested dihydroxy polydimethyl siloxane and polydimethyl siloxane and found them to be immiscible with R134a at room temperature. The results of our work are in the Comparatives below.

SUMMARY OF THE INVENTION

We then unexpectedly found that a particular class of fluorinated silicones is miscible with a refrigerant selected from the group consisting of hydrofluorocarbon and hydrochlorofluorocarbon, and more particularly, tetrafluoroethane. As such, the present invention provides a composition for use in compression refrigeration and air-conditioning comprising: (a) a refrigerant selected from the group consisting of hydrofluorocarbon and hydrochlorofluorocarbon; and (b) a sufficient amount to provide lubrication of at least one fluorinated silicone.

The fluorinated silicone has units therein selected from the group consisting of fluoroalkyl and alkyl; if both fluoroalkyl and alkyl units are present, at least 25% of the units are fluoroalkyl. The fluorinated silicone has a molecular weight between about 280 and about 6,000; a viscosity of about 10 to about 300 centistokes at 38° C. (0.1 to 3.0 cm$^2$/sec); and is miscible in combination with the refrigerant in the range between $-40°$ C. and at least $+20°$ C. The present fluorinated silicones are very stable in the presence of R134a, metals, air, and water.

The present invention also provides a method for lubrication in compression refrigeration and air-conditioning equipment using hydrofluorocarbon or hydrochlorofluorocarbon as a refrigerant. The method comprises the step of: employing as a lubricant at least one of the preceding fluorinated silicone.

Preferably, the fluorinated silicone is of the formula

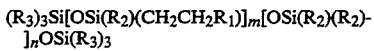

wherein R$_1$ is a partially or fully fluorinated alkyl group having 1 to 3 carbon atoms: each of R$_2$ is the same or different and is hydrogen, methyl, ethyl, or propyl; each of R$_3$ is the same or different and is a methyl, ethyl, vinyl, phenyl, or CH$_2$CH$_2$R wherein R is a partially or fully fluorinated alkyl group having 1 to 3 carbon atoms; m is about 2 to about 40: and n is about 0 to about 40.

More preferably, the fluorinated silicone is of the formula

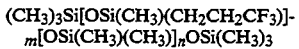

wherein m is about 2 to about 40 and n is 0 to about 40.

Other advantages of the present invention will become apparent from the following description and appended claims.

DETAILED DESCRIPTION OF THE PREFERRED EMBODIMENTS

Refrigerants

The invention relates to the substitution of hydrofluorocarbons and hydrochlorofluorocarbons, and more particularly, tetrafluoroethane and chlorodifluoromethane, and more preferably. 1,1,1,2-tetrafluoroethane for dichlorodifluoromethane, which has been considered to present a danger to the atmospheric ozone layer. R134a has physical characteristics which allow its substitution for R-12 with only a minimum of equipment changes, although it is more expensive and unavailable in large quantities at the present time. Its symmetrical isomer, R134, may also be used. The effect of tetrafluoroethane on atmospheric ozone is considered to be much less than the effect of R-12, and therefore, the substitution of tetrafluoroethane for R-12 is considered probable.

It has been found that the present fluorinated silicone lubricants are suitable for use with hydrochlorofluorocarbons such as R22 and R-502 which are all refrigerants now available in commercial quantities. A composition for use in refrigeration and air-conditioning comprising: (a) chlorodifluoromethane or R502; and (b) the present fluorinated silicones may be used until R134a becomes available in commercial quantities. When R134a is available in commercial quantities, it may be useful to blend R134a with R12, R22, or R502 in addition to using R134a alone. However, it should be understood that only blends of tetrafluoroethane with other refrigerants which are miscible with the fluorinated silicones of the invention in the range of about $-40°$ C. to at least $+30°$ C. are included.

R-12 is used in very large quantities and of the total, a substantial fraction is used for automotive air conditioning. Consequently, the investigation of the lubricants needed for use with R134a (or R134) has emphasized the requirements of automotive air conditioning since the temperature range is generally higher than other refrigeration systems, i.e., about 0° C. to 93° C. Since it has been found that R134a differs in being much less miscible with common lubricants than R-12, the substitution of refrigerants becomes more difficult.

Lubricants

R-12 is fully miscible in ordinary mineral oils and consequently, separation of the lubricants is not a problem. Although it is similar to R12, R134a is relatively immiscible in many lubricants as may be seen by reference to commonly assigned U.S. Pat. No. 4,755,316. Thus, it is necessary to find suitable lubricants which are miscible with R134a (or R134) to avoid refrigerant and lubricant separation.

It is characteristic of some refrigerant-lubricant mixtures that a temperature exists above which the lubricant separates. Since this phenomenon occurs also at some low temperatures, a limited range of temperatures within which the two fluids are miscible may occur. Ideally, this range should span the operating temperature range in which the refrigerant is to operate, but often this is not possible. It is typical of automotive air conditioning systems that a significant fraction of the circulating charge is lubricant and the refrigerant and lubricant circulate together through the system. Separation of the lubricant and refrigerant as they return to the compressor could result in erratic lubrication of the moving parts and premature failure. Other air conditioning system types usually circulate only the relatively smaller amount of lubricant which is carried by the refrigerant gas passing through the compressor and should be less sensitive to the separation problem. Especially with automotive air conditioning, separation of the relatively large amount of lubricant circulating with the refrigerant can also affect the performance of other parts of the system.

In a typical automotive air conditioning system, the temperatures at which the refrigerant is condensed originally will be about 50°–70° C. but may reach 90° C. in high ambient temperature operation. The condensation of hot refrigerant gases in the condensing heat exchanger can be affected if the exchanger is coated with lubricant preferentially so that condensation of the refrigerant occurs by contact with the lubricant film. Thereafter, the two-phase mixture of lubricant and refrigerant must pass through a pressure reduction to the low temperature stage where the refrigerant evaporates and absorbs the heat given up in cooling air and condensing moisture. If lubricant separates at the condenser, then the performance of the evaporator stage can be affected if separate phases persist as the two-phase mixture passes through the pressure reduction step. As with the condenser, accumulation of lubricant on the evaporator coils can affect heat exchange efficiency. In addition, the low evaporator temperatures may result in excessive cooling of the lubricant resulting in a more viscous liquid and trapping of the lubricant in the evaporator. These problems can be avoided if the lubricant and the refrigerant are fully miscible throughout the operating temperature ranges, as was true with R-12 and mineral oil mixtures. R134a, with its limited ability to dissolve lubricants, presents a problem which must be solved.

The present invention relates to the discovery that the following fluorinated silicones are useful with refrigerants selected from the group consisting of hydrofluorocarbons and hydrochlorofluorocarbons, and more particularly, tetrafluoroethane. The fluorinated silicone has units therein selected from the group consisting of fluoroalkyl and alkyl; if both fluoroalkyl and alkyl units are present, at least 25% of the units are fluoroalkyl. The fluorinated silicone has a molecular weight between about 280 and about 6,000; a viscosity of about 10 to about 300 centistokes at 38° C. (0.1 to 3 cm$^2$/sec), and is miscible in combination with the refrigerant in the range between $-40°$ C. and at least $+20°$ C.

Preferably, the fluorinated silicone is of the formula

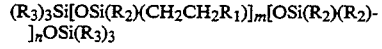

wherein $R_1$ is a partially or fully fluorinated alkyl group having 1 to 3 carbon atoms; each of $R_2$ is the same or different and is hydrogen, methyl, ethyl, or propyl; each of $R_3$ is the same or different and is a methyl, ethyl, vinyl, phenyl, or CH$_2$CH$_2$R wherein R is a partially or fully fluorinated alkyl group having 1 to 3 carbon atoms; m is about 2 to about 40; and n is about 0 to about 40.

A fluorinated silicone which may be useful in the present composition is disclosed in U.S. Pat. No. 3,642,626. The silicone has the following formula:

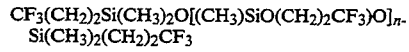

The reference teaches that the silicone has a viscosity of 50 to 100 CS (0.5 to 1 cm$^2$/sec).

More preferably, the fluorinated silicone is of the formula

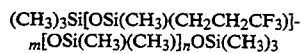

wherein m is about 2 to about 40 and n is 0 to about 40.

As reported in U.S. Pat. No. 4,755,316, silicones were immiscible with R134a at room temperature. We found that when m is 0 and n is 1 to 40 in the preceding fluorinated silicone formula, the resulting siloxane is immiscible with R134a at room temperature. We also found that when, in the preceding fluorinated silicone formula, the percentage of methyltrifluoropropyl groups is 20 percent by weight, the resulting siloxane is immiscible with R134a at room temperature. Thus, it was surprising that the present class of fluorinated silicones is miscible with R134a.

In an even more preferred embodiment, n is equal to 0 and m is 2 to 40 so that the fluorinated silicone is of the formula

$(CH_3)_3Si[OSi(CH_3)(CH_2CH_2CF_3)]_mOSi(CH_3)_3$

In another more preferred embodiment, when n is not equal to 0, at least 50% of the units are methyltrifluoropropyl.

The fluorinated silicones may be formed by any known method such as those disclosed by U.S. Pat. Nos. 2,961,425 and 4,818,423 which are incorporated herein by reference to the extent necessary to complete this disclosure.

It has been found that unlike known lubricants, the present fluorinated silicones have miscibility with R134a at very high viscosities. The present fluorinated silicones also are very stable in the presence of R134a, metals, air, and water. It has been found that the present fluorinated silicone lubricants are also suitable for use with R12, R22, and R502. The fluorinated silicones operate without separation from R134a over much of the operating temperature range. Any separation which does occur would preferably be at the higher temperatures, and thus, would affect the condenser rather than the lower temperature evaporator.

A blend of the present fluorinated silicones wherein the fluorinated silicones have different molecular weights may be used. Miscible blends of fluorinated silicones having varying percentages of fluorine therein may also be used.

The present fluorinated silicones are miscible in combination with tetrafluoroethane in the range between about −40° C. and at least about +20° C., preferably at least about +30° C., more preferably at least about +40° C., and most preferably at least about +50° C. In some applications, fluorinated silicones which are miscible in combination with tetrafluoroethane in the range between −30° C. and at least +20° C. or between −20° C. and at least +20° C. may be useful.

Preferably, the tetrafluoroethane and fluorinated silicone are used in a weight ratio of about 99:1 to about 1:99, and more preferably, in a weight ratio of about 99:1 to about 70:30.

The range of miscibility is not the only factor to be considered when one is selecting a lubricant for automotive air conditioning service (or other refrigeration applications). Lubricating properties also must be satisfactory for the intended application. Practically, this means that for automotive air conditioning, the viscosity of the lubricant will be about 25-150 centistokes (0.25-1.5 cm$^2$/sec), preferably about 100 centistokes (CS) (1 cm$^2$/sec), at 37° C. with a viscosity index of at least 20 in order that the lubricant is sufficiently viscous at high temperatures to lubricate while remaining sufficiently fluid to circulate around the refrigeration circuit at low temperatures. The range of viscosity may also be expressed as about 3-24 CS (0.03-0.24 cm$^2$/sec) at 98.9° C. In addition, the lubricant should be chemically stable and not cause corrosion or other problems in long-term service. Other factors which should be considered in selecting lubricants are compatibility, lubricity, safety, and the like.

Additives which may be used to enhance performance include (1) extreme pressure and antiwear additives, (2) oxidation and thermal stability improvers, (3) corrosion inhibitors, (4) viscosity index improvers, (5) pour and floc point depressants. (6) detergent, (7) anti foaming agents, and (8) viscosity adjusters. Typical members of these classes are listed in Table 1 below.

TABLE 1

| Class Additive | Typical Members of the Class |
|---|---|
| 1. Extreme pressure and antiwear | phosphates, phosphate esters (bicresyl phosphates), phosphites, thiophosphates (zinc diorganodithiophosphates) chlorinated waxes, sulfurized fats and olefins, organic lead compounds, fatty acids, molybdenum complexes, halogen substituted organosilicon compounds, borates, organic esters, halogen substituted phosphorous compounds, sulfurized Diels Alder adducts, organic sulfides, compounds containing chlorine and sulfur, metal salts of organic acids, boron nitrogen compounds, |
| 2. Oxidation and thermal stability improvers | sterically hindered phenols (BHT). aromatic aminess dithiophosphates, phosphites, sulfides, metal salts of dithio acids, organic acids, organic aminess organic |
| 3. Corrosion inhibitors | phosphates, organic alcohols, metal sulfonates, organic phosphites, |
| 4. Viscosity index improvers | polyisobutylene. polymethacrylate, polyalkylstyrenes, |
| 5. Pour Point and/or floc point depressants | polymethyacrylate ethylene - vinyl acetate copolymers, succinamic acid - olefin copolymers, ethylene - alpha olefin copolymers, Friedel-Crafts, condensation products of wax with naphthalene or phenols, |
| 6. Detergents | sulfonates, long-chain alkyl substituted aromatic sulfonic acids, phosphonates, thiophosphonates, phenolates, metal salts of alkylphenols, alkyl sulfides. alkylphenolaldehyde condensation products, metal salts of substituted salicylates, N-substituted oligomers or polymers from the reaction products of unsaturated anhydride and aminess copolymers of methacrylate with N-substituted compounds such as copolymers of methacrylate with N-substituted compounds such as N-vinyl pyrrolidone or dimethylaminoethyl methacrylate, copolymers which incorporate polyester linkages such as vinyl acetate maleic anhydride copolymers. |
| 7. Viscosity Adjusters | Polyisobutylene, polymethacrylates, polyalkystyrenes, naphthenic oils, polyesters, polyvinylchloride, polyphosphates, alkylbenzene oils, paraffinic oils. |

The present invention is more fully illustrated by the following non-limiting Examples.

COMPARATIVES 1-11

The purpose of Comparatives 1-11 is to demonstrate that many known lubricants are not useful with R134a.

The miscibility of each lubricant was determined by combining it with refrigerant in a glass tube and observing the results when the tubes were maintained at preselected temperatures. A tube was filled with the desired amount of lubricant and the refrigerant was added while the oil was frozen in liquid nitrogen. The tube was then sealed and immersed in a thermostated bath. After the temperature was steady, the miscibility of the lubricant and refrigerant was determined by visual observation. The results are shown in Table 2 below.

Because automobile air conditioning operates between 0° C. and 93° C. and the range for lubricants useful therein is about −30° C. to at least +93° C., the foregoing comparative lubricants are not useful with R134a.

EXAMPLE 1

The fluorinated silicone of Example 1 is of the formula

$(CH_3)_3Si[OSi(CH_3)(CH_2CH_2CF_3)]_mOSi(CH_3)_3$

This methyltrifluoropropylsiloxane is commercially available as FS1265 (registered trademark) from Dow-Corning.

TABLE 2

| CO | LUB. | mw | VISC. AT 37° C. (CS)(cm²/sec) | WT. % R134a | MISCIBLE RANGE(°C.) |
|----|------|----|----|----|----|
| 1 | DC-200 | unknown | 100(1) | 90 | imiscible at RT |
| 2 | F-50 | unknown | 77 at 25° C. (0.77) | 90 | imiscible at RT |
| 3 | Krytox143AB | 3700 | 85 at 25° C. (0.85) | 85 | imiscible at and below 10.2° C.; miscible above 10.2° C. through 77° C. |
| 4 | Krytox143AX | 4800 | 150 at 25° C. (1.5) | 85 | immiscible at and below 20.4° C.; miscible above 20.4° C. through 77° C. |
| 5 | Krytox134CZ | 4400 | 15 at 25° C. (0.15) | 85 | immiscible at and below 19.6° C.; miscible above 19.6° C. through 77° C. |
| 6 | BrayCo 1724 (registered trademark) | unknown | 65.5 at 40° C. (0.655) | 85 | immiscible at and below 18.4° C.; miscible above 18.4° C. through 79° C. |
| 7 | S-100 | 4600 | 100 at 40° C. (1) | 85 | imiscible between 30° C. and -54.7° C.; miscable above 30° C. |
| 8 | Masil SFR-70 (registered trademark) | unknown | 70(0.70) | 85 | imiscible at RT |
| 9 | Hasil SF-200 (registered trademark) | unknown | 200(2) | 85 | immiscible at RT |
| 10 | Masil 251-183 (registered trademark) | unknown | 43(0.43) | 85 | imiscible at RT |
| 11 | Halovac-100N | unknown | 100(i) | 84 | miscable above −15.8° C. through +77° C. |

In Table 2, RT stands for room temperature. DC-200 is a silicone which is commercially available from Dow Corning. F-50 is a silicone which is commercially available from Dow Corning. The Krytox materials are of the formula F—[CF(CF₃)CF₂—O]n—CF₂CF₃ and are commercially available from DuPont. Krytox 143 AB has a molecular weight of 3700: Krytox 143 AX has a molecular weight of 4800 and Krytox 134 CZ has a molecular weight of 4400. BrayCo 1724 (registered trademark) is a fluorinated ether which is commercially available from Castrol. S-100 is of the formula F(CF₂CF₂CF₂O)ₙCF₂CF₃ and is commercially available from Daikin. Masil SFR-70 (registered trademark) is dihydroxy polydimethyl siloxane which is commercially available from Mazer Chemicals. Masil SF-200 (registered trademark) is polydimethyl siloxane which is commercially available from Mazer Chemicals. Masil 251-183 (registered trademark) is dimethyl/methyltrifluoropropyl siloxane with 20% methyltrifluoropropyl units which is available from Mazer Chemicals. Halovac-100N is chlorotrifluoroethylene polymer which is commercially available from Halocarbon.

The miscibility with R134a was measured as set forth for the Comparatives above. The results are in Table 3 below. The Ex. 1 lubricant with a viscosity of 300 CS (3 cm²/sec) at 25° C. is miscible with R134a over the temperature range of −60° C. to >+75° C.

The miscibility with R134 was also measured as set forth for the Comparatives above except that R134 was used. The results are in Table 4 below. The Ex. 1 lubricant with a viscosity of 300CS (3 cm²/sec) at 25° C. is miscible with R134 over the temperature range of −60° C. to >+81.1° C.

The miscibility with R12 was also measured as set forth for the Comparatives above except that R12 was used. The results are in Table 5 below. The Ex. 1 lubricant with a viscosity of 300 CS (3 cm²/sec) at 25° C. is miscible with R12 over the temperature range of −21° C. to >+80° C.

The miscibility with R22 was also measured as set forth for the Comparatives above except that R22 was used. The results are in Table 6 below. The Ex. 1 lubricant with a viscosity of 300 CS (3 cm²/sec) at 25° C. is miscible with R22 over the temperature range of −60° C. to > +76° C.

EXAMPLE 2

A fluorinated silicone of the formula $$[CH_3]_3Si[OSi(CH_3)(CH_2CH_2CF_3)O]_m[Si(CH_3)_2O]_nSi[CH_3]_3$$

wherein 50% of the units are methyltrifluoropropyl, is commercially available from Huls Petrarch Company.

The miscibility with R134a was measured as set forth for the Comparatives above. The results are in Table 3 below. The Ex. 2 lubricant with a viscosity of 75 CS (0.75 cm²/sec) at 25° C. is miscible with R134a over the temperature range of −60° C. to > +75° C.

The miscibility with R134 was also measured as set forth for the Comparatives above except that R134 was used. The results are in Table 4 below. The Ex. 2 lubricant with a viscosity of 75 CS (0.75 cm²/sec) at 25° C. is miscible with R134 over the temperature range of −52° C. to > +78.8° C.

The miscibility with R12 was also measured as set forth for the Comparatives above except that R12 was used. The results are in Table 5 below. The Ex. 2 lubricant with a viscosity of 75 CS (0.75 cm²/sec) at 25° C. is miscible with R12 over the temperature range of −33.5° C. to > +80° C.

TABLE 3

| LUB. | VISC. AT 25° C. (CS)(cm²/s) | WT. % R134a | MISCIBLE RANGE (°C.) |
|---|---|---|---|
| EX. 1 | 300 (3) | 85 | −60 to > +75 |
|  |  | 50 | −60 to > +75 |
| EX. 2 | 75(0.75) at 38° C. | 85 | −60 to > +75 |

TABLE 4

| LUB. | VISC. AT 25° C. (CS)(cm²/s) | WT. % R134 | MISCIBLE RANGE (°C.) |
|---|---|---|---|
| EX. 1 | 300 (3) | 85 | −60 to > +81.1 |
| EX. 2 | 75(0.75) at 38° C. | 85 | −52 to > +78.8 |

TABLE 5

| LUB. | VISC. AT 25° C. (CS)(cm²/s) | WT. % R12 | MISCIBLE RANGE (°C.) |
|---|---|---|---|
| 1 | 300 (3) | 85 | −21 to > +80 |
|  |  | 51 | −21 to > +80 |
| 2 | 75 at 38° C. (0.75) | 85.4 | −33.5 to > +80 |

TABLE 6

| VISC. AT 25° C. (CS)(cm²/sec) | WT. % R22 | MISCIBLE RANGE (°C.) |
|---|---|---|
| 300(3) | 85 | −60 to > +76 |
|  | 50 | −60 to > +75 |

EXAMPLE 3

A fluorinated silicone of the formula $$[CH_3]_3Si[OSi(CH_3)(CH_2CH_2CF_3)]_8[OSi(CH_3)_2]_{24}OSi[CH_3]_3$$

has 25 percent by weight of its units as methyltrifluoropropyl and may be prepared by one of the methods disclosed above.

The miscibility with 1 to 99 percent by weight R134a, R12, and R22 is measured as set forth for the Comparatives above.

EXAMPLE 4

A fluorinated silicone of the formula $$[CH_3]_3Si[OSi(CH_3)(CH_2CH_2CF_3)]_{10}[OSi(CH_3)_2]_{20}OSi[CH_3]_3$$

has 33 percent by weight of its units as methyltrifluoropropyl and may be prepared by one of the methods disclosed above.

The miscibility with 1 to 99 percent by weight R134a, R12, and R22 is measured as set forth for the Comparatives above.

EXAMPLE 5

A fluorinated silicone of the formula $$[CH_3]_3Si[OSi(CH_3)(CH_2CH_2CF_3)]_m[OSi(CH_3)_2]_nOSi[CH_3]_3$$

where m is 15 and n is 10 and thus, 60 percent by weight of the units are methyltrifluoropropyl, may be prepared by one of the methods disclosed above.

The miscibility with 1 to 99 percent by weight R134a, R12, and R22 is measured as set forth for the Comparatives above.

EXAMPLE 6

A fluorinated silicone of the formula $$[CH_3]_3Si[OSi(CH_3)(CH_2CH_2CF_3)]_m[OSi(CH_3)_2]_nOSi[CH_3]_3$$

where m is 30 and n is 10 and thus, 75 percent by weight of the units are methyltrifluoropropyl, may be prepared by one of the methods disclosed above.

The miscibility with 1 to 99 percent by weight R134a, R12, and R22 is measured as set forth for the Comparatives above.

EXAMPLES 7-25

The miscibility of the following fluorinated silicones with R134a, R12, and R22 is measured as set forth in the Comparatives above.

$$(R_3)_3Si[OSi(R_2)(CH_2CH_2R_1)]_m[OSi(R_2)(R_2)]_nOSi(R_3)_3$$

| EX | R1 | R2 | R3 | m | n |
|---|---|---|---|---|---|
| 7 | CF$_3$ | C$_2$H$_5$ | CH$_3$ | 40 | 10 |
| 8 | C$_2$F$_5$ | C$_3$H$_7$ | C$_2$H$_5$ | 30 | 20 |
| 9 | C$_3$F$_7$ | H | CH$_2$=CH | 20 | 20 |
| 10 | CHF$_2$ | CH$_3$ | C$_6$H$_5$ | 10 | 20 |
| 11 | CH$_2$F | C$_2$H$_5$ | (CH$_2$)$_2$CF$_3$ | 5 | 20 |
| 12 | C$_2$HF$_4$ | C$_3$H$_7$ | (CH$_2$)$_2$(CHF$_2$) | 2 | 1 |
| 13 | C$_2$H$_2$F$_3$ | H | (CH$_2$)$_2$(CH$_2$F) | 5 | 5 |
| 14 | C$_2$H$_3$F$_2$ | CH$_3$ | (CH$_2$)$_2$(C$_2$HF$_4$) | 40 | 5 |
| 15 | C$_2$H$_4$F | C$_2$H$_5$ | (CH$_2$)$_2$(C$_2$H$_2$F$_3$) | 5 | 2 |
| 16 | C$_3$HF$_6$ | C$_3$H$_7$ | (CH$_2$)$_2$(C$_2$H$_3$F$_2$) | 5 | 0 |
| 17 | C$_3$H$_2$F$_5$ | H | (CH$_2$)$_2$(C$_2$H$_4$F) | 5 | 0 |
| 18 | C$_3$H$_3$F$_4$ | CH$_3$ | (CH$_2$)$_2$(C$_3$HF$_6$) | 15 | 0 |
| 19 | C$_3$H$_4$F$_3$ | C$_3$H$_7$ | (CH$_2$)$_2$(C$_3$H$_2$F$_5$) | 20 | 0 |
| 20 | C$_3$H$_5$F$_2$ | CH$_3$ | (CH$_2$)$_2$(C$_3$H$_3$F$_4$) | 25 | 0 |
| 21 | C$_3$H$_6$F | C$_2$H$_5$ | (CH$_2$)$_2$(C$_3$H$_4$F$_3$) | 30 | 0 |

-continued

| EX | R1 | R2 | R3 | m | n |
|---|---|---|---|---|---|
| 22 | $CF_3$ $CH_3$ $C_3H_4$ | $C_2H_5$ $C_2H_5$ | $CH_3$ | 40 | 10 |
| 23 | $C_3F_7$ | $CH_3$ $C_2H_5$ $C_2H_5$ | $CH_2$=CH $CH_3$ | 20 | 20 |
| 24 | $CHF_2$ | $C_2H_5$ $C_3H_7$ $CH_3$ | $C_6H_5$ $(CH_2)_2CF_3$ | 10 | 20 |
| 25 | $C_2HF_4$ | $CH_3$ $C_2H_5$ $C_2H_5$ | $(CH_2)_2(CHF_2)$ $(CH_2)_2(CH_2F)$ | 2 | 1 |

EXAMPLE 26

The miscibility of a blend of the lubricants of Examples 7 and 8 with R134a, R12, and R22 is measured as set forth in the Comparatives above.

EXAMPLE 27

The stability of any refrigerant/lubricant combination is very important in deciding the feasibility of using it in real systems. The stability of fluorinated silicones with R134a in contact with aluminum, copper and cold rolled steel was therefore studied in sealed tubes. Every tube contained the three metals, 1.4 g of refrigerant, and 1 cc of the lubricant of Example 1. One aim of the study was to determine the effect of air and water on the stability of the system described.

Eight tubes were used in the study. Table 7 shows which tubes contained air and/or water or were empty. Tubes 1 and 2 contained both air and water. Tubes 3 and 4 contained air but no water. Tubes 5 and 6 contained water but no air. Tubes 7 and 8 contained neither air nor water. The tubes were aged in an oven at 149° C. for two weeks.

The tubes were then removed from the oven and examined visually for color changes and other signs of deterioration. No signs of deterioration were observed. Further, the tubes were opened and the refrigerant was removed. The oil was then washed from the tube with hexane. Further, the tube was then washed with an aqueous buffer solution. The hexane solution of oil was then extracted with the same aqueous buffer solution. The two aqueous buffer solutions were then examined by ion chromatography for F$^-$ ions. The total volume of the aqueous buffer solution was 20 cc. The results are shown in Table 7.

TABLE 7

| TUBE | AIR | WATER | F$^-$(PPM) |
|---|---|---|---|
| 1 | + | + | 3.2 |
| 2 | + | + | 1.8 |
| 3 | + | − | 2.0 |
| 4 | + | − | 2.3 |
| 5 | − | + | 1.2 |
| 6 | − | + | 1.7 |
| 7 | − | − | 1.8 |
| 8 | − | − | 1.5 |

The fluoride ion concentrations found were just slightly higher than the background concentration. The results indicate very minimal breakdown of the refrigerant and the lubricant under the test conditions. The test conditions are much more severe than the operating conditions of any refrigeration compressor or auto air-conditioning compressor. The system is therefore stable enough for use in refrigeration and auto air-conditioning applications.

EXAMPLE 28

R12 with a mineral oil is the currently used working fluid in automotive air-conditioning systems. Any new working fluid should be as stable as this system. The stability of R12 with BVM100N, a paraffinic mineral oil used in automotive air-conditioning systems and supplied by BVM Associates, was therefore tested. The results are shown in Table 8.

TABLE 8

| TUBE | AIR | WATER | F$^-$ | Cl$^-$ |
|---|---|---|---|---|
| 1 | + | + | 18.1 | 442.3 |
| 2 | + | + | 23.2 | 448.3 |
| 3 | + | − | 7.09 | 250.5 |
| 4 | + | − | 8.33 | 223.7 |
| 5 | − | + | 18.23 | 473.0 |
| 6 | − | + | 29.42 | 472.0 |
| 7 | − | − | 2.52 | 168.0 |
| 8 | − | − | 3.04 | 134.9 |

In the case of R12, both F$^-$ and Cl$^-$ are generated. With R134a, only F$^-$ is generated. One way of comparing is therefore to compare the F$^-$ ions produced in both cases. Much more F$^-$ is produced with the R12/mineral oil system than with the R134a/Ex. 1 system. The second way of making the comparison is to consider the total F$^-$ and Cl$^-$ ion concentration as an indication of acid content. Again, the R134a/Ex. 1 is markedly more stable than the R12/mineral oil system under all the conditions studied.

Having described the invention in detail and by reference to preferred embodiments thereof, it will be apparent that modifications and variations are possible without departing from the scope of the invention defined in the appended claims.

What is claimed is:

1. A composition for use in compression refrigeration and air-conditioning comprising:
   (a) a refrigerant selected from the group consisting of hydrofluorocarbon and hydrochlorofluorocarbon; and
   (b) a sufficient amount to provide lubrication of at least one fluorinated silicone of the formula

wherein R$_1$ is a partially or fully fluorinated alkyl group having 1 to 3 carbon atoms; each of R$_2$ is the same or different and is hydrogen, methyl, ethyl or propyl; each of R$_3$ is the same or different and is methyl, ethyl, vinyl, phenyl, or CH$_2$CH$_2$R wherein R is a partially or fully fluorinated alkyl group having 1 to 3 carbon atoms; m is about 2 to about 40; and being miscible in combination with said refrigerant in the range between −40° C. and at least +20° C.

2. The composition of claim 1 wherein said refrigerant is a hydrochlorofluorocarbon.

3. The composition of claim 2 wherein said hydrochlorofluorocarbon is chlorodifluoromethane.

4. The composition of claim 1 wherein said refrigerant is a hydrofluorocarbon.

5. The composition of claim 4 wherein said hydrofluorocarbon is tetrafluoroethane.

6. The composition of claim 5 wherein said tetrafluoroethane is 1,1,1,2-tetrafluoroethane.

7. The composition of claim 1 wherein the miscible range is between −40° C. and at least +30° C.

8. The composition of claim 1 wherein the miscible range is between −40° C. and at least +40° C.

9. The composition of claim 1 wherein said fluorinated silicone is of the formula (CH$_3$)$_3$Si[OSi(CH$_3$)(CH$_2$CH$_2$CF$_3$)]$_m$OSi(CH$_3$)$_3$ wherein m is about 2 to about 40.

10. A method for improving lubrication in compression refrigeration and air-conditioning equipment using hydrofluorocarbon or hydrochlorofluorocarbon as a refrigerant comprising the step of:
employing as a lubricant at least one fluorinated silicone of the formula (R$_3$)$_3$Si[OSi(R$_2$)(CH$_2$CH$_2$R$_1$)]$_m$OSi(R$_3$)$_3$ wherein R$_1$ is a partially or fully fluorinated alkyl group having 1 to 3 carbon atoms; each of R$_2$ is the same or different and is hydrogen, methyl, ethyl, or propyl; each of R$_3$ is the same or different and is a methyl, ethyl, vinyl, phenyl, or CH$_2$CH$_2$R wherein R is a partially or fully fluorinated alkyl group having 1 to 3 carbon atoms; m is about 2 to about 40 and being miscible in combination with said refrigerant in the range between −40° C. and at least +20° C.

11. The method of claim 10 wherein said refrigerant is hydrochlorofluorocarbon.

12. The method of claim 11 wherein said hydrochlorofluorocarbon is chlorodifluoromethane.

13. The method of claim 10 wherein said refrigerant is hydrofluorocarbon.

14. The method of claim 13 wherein said hydrofluorocarbon is tetrafluoroethane.

15. The method of claim 14 wherein said tetrafluoroethane is 1,1,1,2-tetrafluoroethane.

16. The method of claim 10 wherein said fluorinated silicone is of the formula (CH$_3$)$_3$Si[OSi(CH$_3$)(CH$_2$CH$_2$CF$_3$)]$_m$OSi(CH$_3$)$_3$ wherein m is about 2 to about 40.

17. A composition for use in compression refrigeration and air-conditioning comprising:
(a) a refrigerant selected from the group consisting of hydrofluorocarbon and hydrochlorofluorocarbon; and
(b) a sufficient amount to provide lubrication of at least one fluorinated silicone having the formula (R$_3$)$_3$Si[OSi(R$_2$)(CH$_2$CH$_2$R$_1$)]$_m$[OSi(R$_2$)(R$_2$)]$_n$OSi(R$_3$)$_3$ wherein R$_1$ is a partially or fully fluorinated alkyl group having 1 to 3 carbon atoms; each of R$_2$ is the same or different and is hydrogen, methyl, ethyl, or propyl; each of R$_3$ is the same or different and is methyl, ethyl, vinyl, phenyl, or CH$_2$CH$_2$R wherein R is a partially or fully fluorinated alkyl group having 1 to 3 carbon atoms; m is about 2 to about 40; and n is about 3 to about 40 wherein at least 25% of the units are said fluoroalkyl units, and being miscible in combination with said refrigerant in the range between −40° C. and at least +20° C.

18. The composition of claim 17 wherein said refrigerant is a hydrochlorofluorocarbon.

19. The composition of claim 18 wherein said hydrochlorofluorocarbon is chlorodifluoromethane.

20. The composition of claim 17 wherein said refrigerant is a hydrofluorocarbon.

21. The composition of claim 20 wherein said hydrofluorocarbon is tetrafluoroethane.

22. The composition of claim 21 wherein said tetrafluoroethane is 1,1,1,2-tetrafluoroethane.

23. The composition of claim 17 wherein the miscible range is between −40° C. and at least +30° C.

24. The composition of claim 17 wherein the miscible range is between −40° C. and at least +40° C.

25. The composition of claim 17 wherein said fluorinated silicone is of the formula (CH$_3$)$_3$Si[OSi(CH$_3$)(CH$_2$CH$_2$CF$_3$)]$_m$[OSi(CH$_3$)(CH$_3$)]$_n$OSi(CH$_3$)$_3$.

26. The composition of claim 25 wherein at least 50% of the units are methyltrifluoropropyl.

27. A method for improving lubrication in compression refrigeration and air-conditioning equipment using hydrofluorocarbon or hydrochlorofluorocarbon as a refrigerant comprising the step of:
employing as a lubricant at least one fluorinated silicone of the formula (R$_3$)$_3$Si[OSi(R$_2$)(CH$_2$CH$_2$R$_1$)]$_m$[OSi(R$_2$)(R$_2$)]$_n$OSi(R$_3$)$_3$ wherein R$_1$ is a partially or fully fluorinated alkyl group having 1 to 3 carbon atoms; each of R$_2$ is the same or different and is hydrogen, methyl, ethyl, or propyl; each of R$_3$ is the same or different and is a methyl, ethyl, vinyl, phenyl, or CH$_2$CH$_2$R wherein R is a partially or fully fluorinated alkyl group having 1 to 3 carbon atoms; m is about 2 to about 40; and n is about 3 to about 40, and being miscible in combination with said refrigerant in the range between −40° C. and at least +20° C.

28. The method of claim 27 wherein said refrigerant is hydrochlorofluorocarbon.

29. The method of claim 28 wherein said hydrochlorofluorocarbon is chlorodifluoromethane.

30. The method of claim 27 wherein said refrigerant is hydrofluorocarbon.

31. The method of claim 30 wherein said hydrofluorocarbon is tetrafluoroethane.

32. The method of claim 31 wherein said tetrafluoroethane is 1,1,1,2-tetrafluoroethane.

33. The method of claim 27 wherein said fluorinated silicone is of the formula (CH$_3$)$_3$Si[OSi(CH$_3$)(CH$_2$CH$_2$CF$_3$)]$_m$[OSi(CH$_3$)(CH$_3$)]$_n$OSi(CH$_3$)$_3$.

* * * * *